(12) United States Patent
Tajima

(10) Patent No.: US 11,223,733 B1
(45) Date of Patent: Jan. 11, 2022

(54) MOVING A READING POSITION OF AN IMAGE READING DEVICES BASED ON A READING MAGNIFICATION OF PATTERN IMAGES

(71) Applicant: TOSHIBA TEC KABUSHIKI KAISHA, Tokyo (JP)

(72) Inventor: Akinori Tajima, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/984,314

(22) Filed: Aug. 4, 2020

(51) Int. Cl.
  *H04N 1/04* (2006.01)
  *H04N 1/00* (2006.01)

(52) U.S. Cl.
  CPC ..... *H04N 1/00803* (2013.01); *H04N 1/00596* (2013.01); *H04N 1/00602* (2013.01); *H04N 1/00782* (2013.01)

(58) Field of Classification Search
  CPC .......... H04N 1/00803; H04N 1/00596; H04N 1/00602; H04N 1/00782
  USPC ........................................................ 358/474
  See application file for complete search history.

(56) References Cited

U.S. PATENT DOCUMENTS

| | | | | |
|---|---|---|---|---|
| 6,115,146 A | * | 9/2000 | Suzuki | H04N 5/23212 358/474 |
| 7,969,623 B2 | * | 6/2011 | Kagami | H04N 1/00822 358/498 |
| 2011/0102865 A1 | * | 5/2011 | Ishida | H04N 1/121 358/498 |
| 2014/0118611 A1 | * | 5/2014 | Hamano | H04N 5/23212 348/350 |

FOREIGN PATENT DOCUMENTS

JP 2009-038638 2/2009

* cited by examiner

*Primary Examiner* — Gabriel I Garcia
(74) *Attorney, Agent, or Firm* — Amin, Turocy & Watson, LLP

(57) ABSTRACT

According to one embodiment, there is provided an image reading device including a conveyance unit, a reading unit, and a control unit. The conveyance unit is configured to convey a sheet to a reading surface. The reading unit is configured to read a predetermined pattern image formed on the sheet conveyed by the conveyance unit for each of a plurality of reading candidate positions on the reading surface which are different from each other in a conveyance direction of the sheet. The control unit is configured to cause a reading position of the reading unit to be moved in the conveyance direction on the reading surface by causing the reading unit to be moved based on reading magnification of each of the pattern images read for each of the reading candidate positions.

20 Claims, 10 Drawing Sheets

MOVING A READING POSITION OF AN IMAGE READING DEVICES BASED ON A READING MAGNIFICATION OF PATTERN IMAGES

FIELD

Embodiments described herein relate generally to an image reading device, an image forming apparatus, and an image reading method.

BACKGROUND

Conventionally, an image forming apparatus such as a multi-function peripheral (MFP) is provided with an image reading device that reads a document. In an image reading device including an automatic document feeder (ADF), through-read glass is disposed at a position (hereinafter referred to as "reading position") where a conveyed document is read. A document moving on the reading position by being conveyed by the ADF is read by an image scanning optical system fixed near the reading position.

For example, dust such as paper dust generated by conveyance of a paper sheet may adhere to the through-read glass. When a document is read with dust adhered, dust present as dots appears as longitudinal stripes extending in a document feeding direction (sub-scanning direction) in an image. As such, when dust adheres to the through-read glass, image quality is significantly deteriorated.

At a position (hereinafter, referred to as "contact position") where the conveyed paper sheet and the through-read glass come into contact with each other, the adhered dust may be scraped out as the paper sheet is conveyed. The adhered dust is scraped out, for example, by friction with an edge of the paper sheet or a front surface of the paper sheet. In this way, a self-cleaning effect occurs at the contact position. For that reason, deterioration of the image quality can be suppressed by setting the contact position as the reading position.

However, in a manufacturing process of the image forming apparatus, component tolerance, variation during product assembly, and the like may occur. As a result, the contact position and the reading position are not always coincident with each other. For that reason, there is a problem that the document may not be read at the contact position where the self-cleaning effect is high.

DETAILED DESCRIPTION

Embodiments provide an image reading device, an image forming apparatus, and an image reading method capable of reading a document at a position where a self-cleaning effect is high.

In general, according to one embodiment, there is provided an image reading device including a conveyance unit, a reading unit, and a control unit. The conveyance unit is configured to convey a sheet to a reading surface. The reading unit is configured to read a predetermined pattern image formed on the sheet conveyed by the conveyance unit for each of a plurality of reading candidate positions on the reading surface which are different from each other in a conveyance direction of the sheet. The control unit is configured to cause a reading position of the reading unit to be moved in the conveyance direction on the reading surface by causing the reading unit to be moved based on reading magnification of each of the pattern images read for each of the reading candidate positions.

Figure 1:
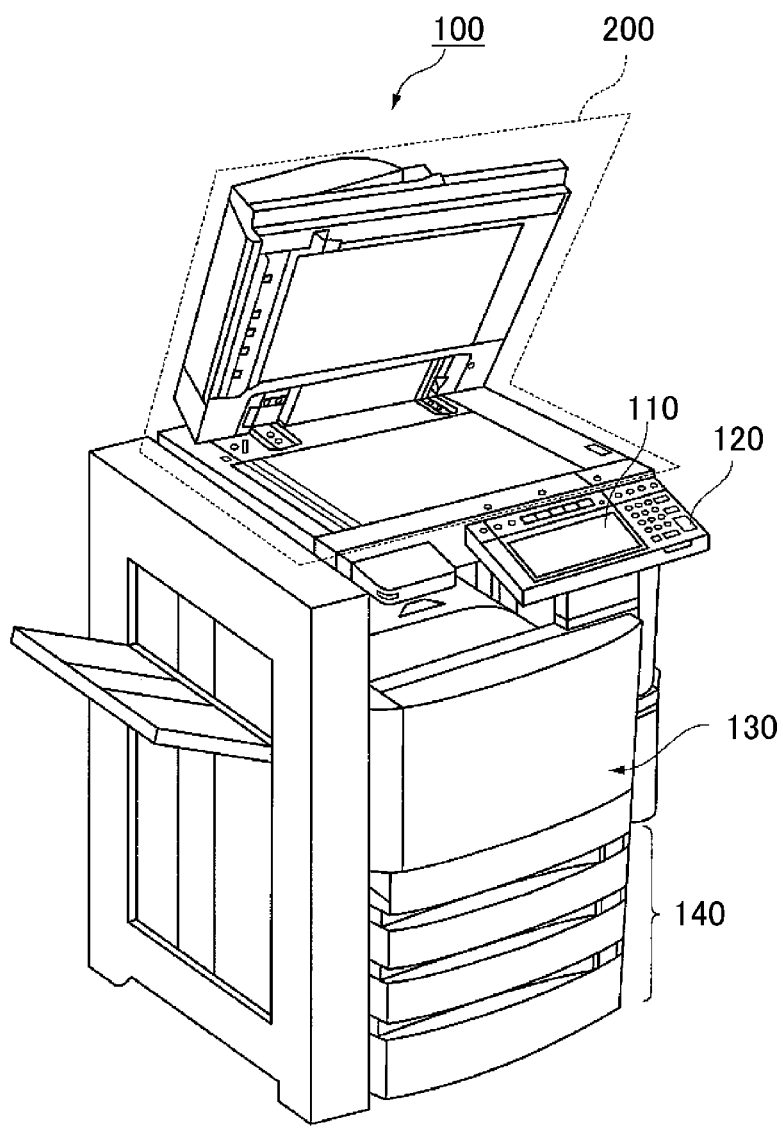
FIG. 1 is an external view illustrating the overall configuration of an image forming apparatus 100.

Hereinafter, an image reading device, an image forming apparatus, and an image reading method according to an embodiment will be described with reference to the accompanying drawings. The overall configuration of an image forming apparatus 100 of the embodiment will be described with reference to FIG. 1. FIG. 1 is an external view illustrating an example of the overall configuration of the image forming apparatus 100.

The image forming apparatus 100 is, for example, a multi-function peripheral (MFP). The image forming apparatus 100 includes a display 110, a control panel 120, a printer unit 130, a sheet storage unit 140, and an image reading unit 200. The image forming apparatus 100 is an example of an image reading device, and may be a copying machine, a scanner, or the like.

The display 110 is an image display device such as a liquid crystal display (LCD) or an organic electro luminescence (EL) display. The display 110 displays various types of information regarding the image forming apparatus 100. The display 110 and the control panel 120 described below may be configured as an integrated touch panel.

The control panel 120 includes a plurality of input buttons. The control panel 120 receives a user's input operation. The control panel 120 generates an operation signal according to the input operation performed by the user. The control panel 120 outputs the generated operation signal to a control unit 101.

The control panel 120 (input unit) receives, for example, a user's input operation indicating an instruction for switching an operation mode of the image forming apparatus 100 from a normal mode to an adjustment mode. In this case, the control panel 120 generates an operation signal indicating the instruction (hereinafter, referred to as "adjustment mode switching instruction"). The control panel 120 outputs the generated adjustment mode switching instruction to the control unit 101.

The normal mode is an operation mode in which the image forming apparatus 100 operates as a general image forming apparatus or an image reading device. In contrast, the adjustment mode is an operation mode when the image forming apparatus 100 executes adjustment of a reading position of a document in the image reading unit 200.

The printer unit 130 (image forming unit) forms an image on a sheet S based on image data generated by the image reading unit 200. The printer unit 130 may be a device that fixes a visible image such as a toner image on the sheet S to form an image. Alternatively, the printer unit 130 may be a device that forms an image on the sheet S by an inkjet method.

The sheet S is, for example, paper, label paper sheet, or the like. The sheet S may be any sheet as long as the image forming apparatus 100 can form an image on the front surface thereof. The sheet S on which an image is formed may be a sheet stored in the sheet storage unit 140 or a sheet manually inserted into the image forming apparatus 100.

The sheet storage unit 140 stores the sheet S used for image formation by the printer unit 130.

The image reading unit 200 reads an image formed on the sheet S based on brightness and darkness of light, and generates image data that is digital data. The image reading unit 200 records the generated image data in an auxiliary storage device 103 described later. The image reading unit 200 may output the generated image data to the printer unit 130. The image reading unit 200 may output the generated image data to another information processing apparatus or the like via a network. Details of the configuration of the image reading unit 200 will be described later.

Figure 2:
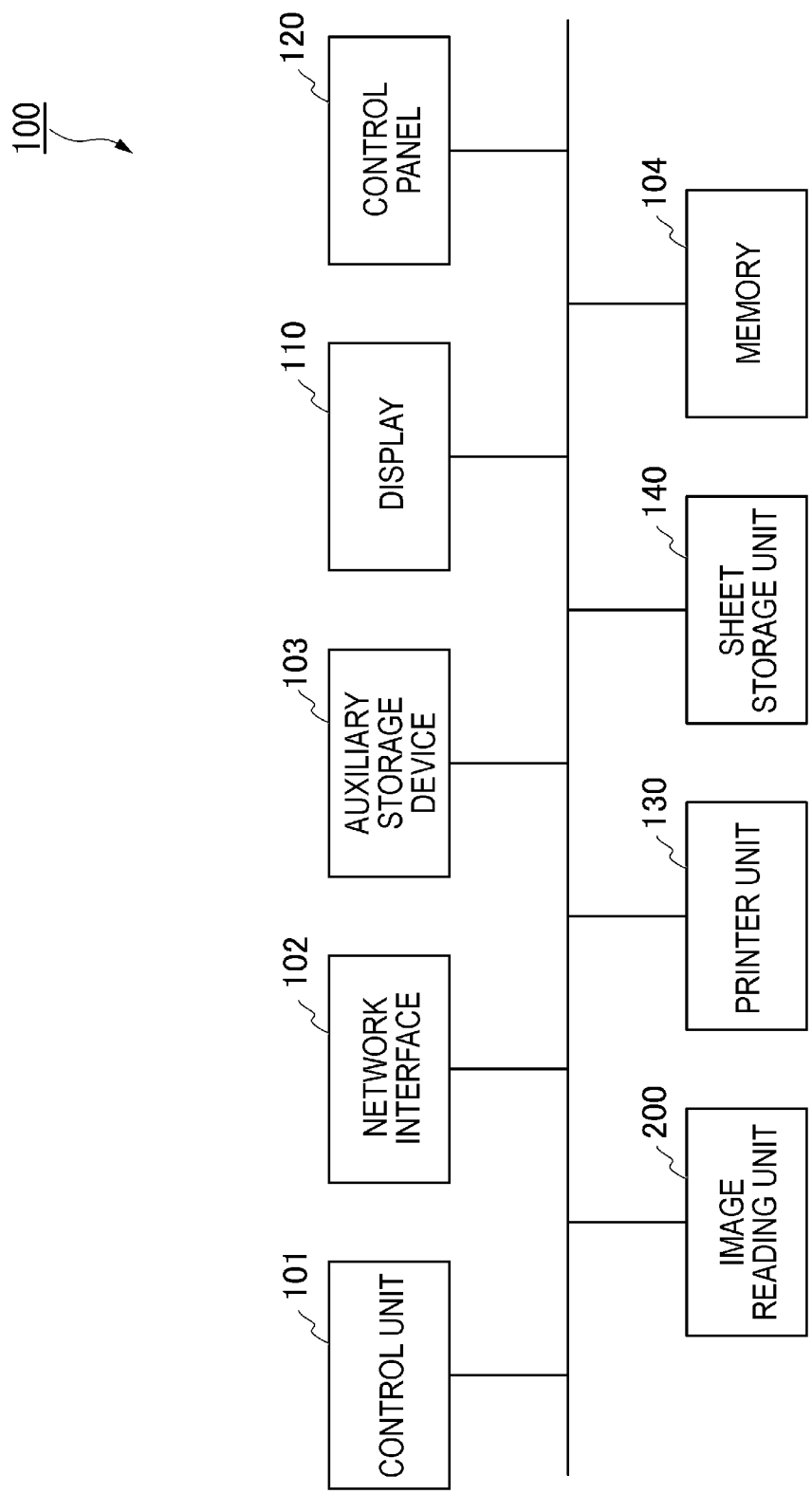
FIG. 2 is a block diagram illustrating a hardware configuration of the image forming apparatus 100.

Next, a hardware configuration of the image forming apparatus 100 according to this embodiment will be described. FIG. 2 is a block diagram illustrating a hardware configuration of the image forming apparatus 100.

The image forming apparatus 100 includes the control unit 101, a network interface 102, the auxiliary storage device 103, a memory 104, the display 110, the control panel 120, the printer unit 130, the sheet storage unit 140, and the image reading unit 200. The functional units included in the image forming apparatus 100 are connected by an internal bus. The respective functional units can input and output data to and from each other. For the functional units already described with reference to FIG. 1, the same reference numerals as in FIG. 1 are given and the description thereof is omitted.

The control unit 101 controls the operation of each functional unit of the image forming apparatus 100. The control unit 101 causes each functional unit to execute various processing by executing a program. The control unit 101 is configured using a processor such as a central processing unit (CPU). The program is stored in advance in the memory 104, for example.

The control unit 101 acquires the adjustment mode switching instruction output from the control panel 120. When the adjustment mode switching instruction is acquired, the control unit 101 outputs the adjustment mode switching instruction to the control unit 222 (control board) of the image reading device 200 described later.

The network interface 102 transmits and receives data to and from an external apparatus. The network interface 102 operates as an input interface and receives various data transmitted from the external apparatus. The network interface 102 operates as an output interface and transmits various data to the external apparatus.

The auxiliary storage device 103 is a storage medium such as a hard disk drive (HDD) or a solid state drive (SSD). The auxiliary storage device 103 stores various data. The various data are, for example, image data and the like. The image data is digital data generated by the image reading unit 200, for example.

The memory 104 is a storage medium such as a random access memory (RAM). The memory 104 temporarily stores data and programs used by each functional unit included in the image forming apparatus 100. A configuration in which the image data described above generated by the image reading unit 200 may be recorded in the memory 104 instead of being recorded in the auxiliary storage device 103 may be adopted.

Figure 3:
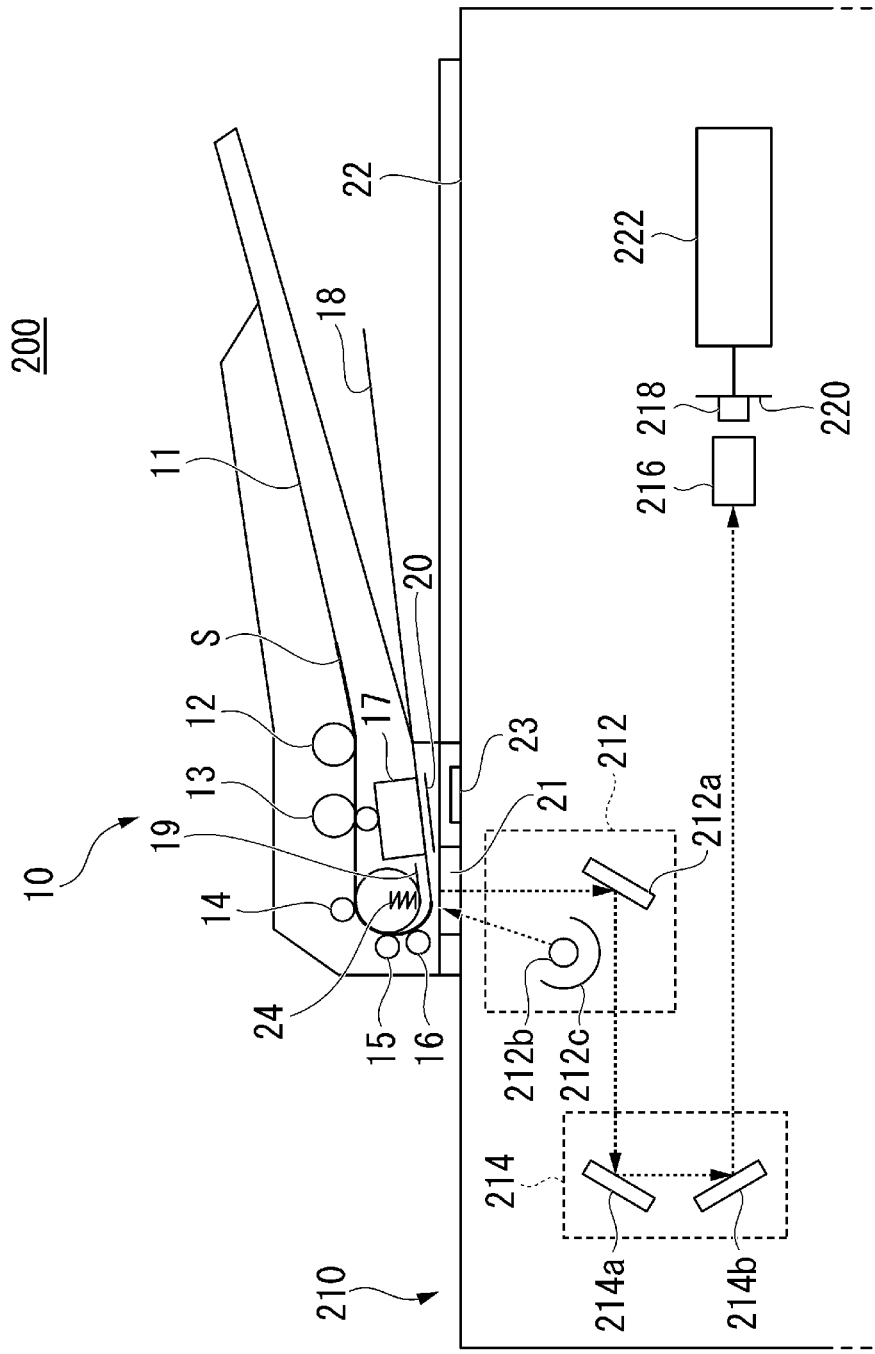
FIG. 3 is a cross-sectional view illustrating a configuration of an image reading unit 200.

Next, a configuration of image reading by the image reading unit 200 of the embodiment will be described with reference to FIG. 3. FIG. 3 is a cross-sectional view illustrating an example of the configuration of the image reading unit 200.

The image reading unit 200 is a double-sided reading type image reading device that reads a first surface and a second surface of the sheet S. The image reading unit 200 includes a first image reading unit 210 and a second image reading unit 17. The image reading unit 200 reads the first surface of the sheet S by the first image reading unit 210. The image reading unit 200 reads the second surface, which is the back surface of the first surface of the sheet S, by the second image reading unit 17. The second image reading unit 17 is, for example, a scanner module. The image reading unit 200 may be a single-sided reading type image reading device that does not include the second image reading unit 17.

The image reading unit 200 includes an automatic document feeder (ADF) 10. The ADF 10 conveys the sheet S placed on a document tray 11, which will be described later, to the first image reading unit 210 and the second image reading unit 17. The image reading unit 200 is a through-read type image reading device that reads an image formed on the sheet S that is moved by conveyance by the ADF 10 at a predetermined reading position.

The ADF 10 (conveyance unit) includes a document tray 11, a conveyance mechanism, and a sheet discharge tray 18. The conveyance mechanism includes a pickup roller 12, a plurality of conveyance rollers (conveyance rollers 13, 15, and 16) and a registration roller 14. The conveyance mechanism includes a drive unit that generates a torque that rotates the pickup roller 12, the conveyance rollers 13, 15, and 16, and the registration roller 14. The drive unit is, for example, a motor or a solenoid.

On the document tray 11, the sheet S to be read by the first image reading unit 210 and the second image reading unit 17 is placed. The pickup roller 12 picks up the sheets S one by one from the document tray 11. The pickup roller 12 sends the picked up sheet S toward a conveyance path.

The registration roller 14 aligns a leading end position of the sheet S sent from the pickup roller 12. The registration roller 14 sends the sheet S whose leading end position is aligned toward the conveyance rollers 15 and 16. The conveyance rollers 15 and 16 convey the sheet S sent from the registration roller 14 toward the through-read glass 21 and the second image reading unit 17 included in the first image reading unit 210.

The sheet S first passes through an image reading range of the first image reading unit 210, and then passes through an image reading range of the second image reading unit 17. A configuration in which the sheet S may first pass through the image reading range of the second image reading unit 17 and then pass through the image reading range of the first image reading unit 210 may be adopted. The sheet S that passes through the first image reading unit 210 and the second image reading unit 17 is discharged to the sheet discharge tray 18.

The first image reading unit 210 includes the through-read glass 21, a platen glass 22, a white reference plate 23, a first carriage 212, a second carriage 214, a lens 216, and a charge coupled device (CCD) sensor 218, a CCD sensor substrate 220, and a control unit 222.

The first image reading unit 210 (reading unit) is realized by an image scanner of a reduction optical system. In the case of the reduction optical system using the CCD sensor 218 and the lens 216, a focus distance is reduced by the lens 216 in order to make a length of the CCD sensor 218 correspond to a main scanning length of a document surface. For example, the main scanning length is about 300 [mm], while the length of the CCD sensor 218 is about 30 [mm]. For that reason, an angle of view is generated, and the magnification changes as the distance changes.

The through-read glass 21 (reading window glass) is an opening window (reading surface) for reading an image formed on the sheet S that is moved by the conveyance by the ADF 10. The platen glass 22 is a document placement table on which the sheet S is placed. In this embodiment, the image formed on the sheet S placed on the platen glass 22 is not read.

The first carriage 212 includes a reflection plate 212-1, a light source 212-2, and a retractor 212-3. The light source 212-2 emits light in the direction of a predetermined reading position on the through-read glass 21. Light emitted from the light source 212-2 passes through the reading position on the through-read glass 21 and is guided toward the conveyance path of the sheet S. Light reflected by the sheet S after being emitted from the light source 212-2 is guided to the reflection plate 212-1. The reflection plate 212-1 reflects incident light in the direction of second carriage 214.

An urging member 24 urges the sheet S moving by the conveyance by the ADF 10 toward the through-read glass 21 side. With this configuration, a contact position where the conveyed sheet S and the through-read glass 21 come into contact with each other occurs. A contact position c on the through-read glass 21 is the position where pressure applied by the urging member 24 is the highest.

The contact position and the reading position of the first image reading unit 210 are not always coincident with each other. This is because, for example, in the manufacturing process of the image reading device 200, component tolerance, variation during product assembly, and the like occur. The reading position of the first image reading unit 210 is a position on the through-read glass 21 through which light emitted from the light source 212-2 passes.

The control unit 222 (control board) can cause the position of the first carriage 212 to be moved in the conveyance direction of the sheet S by the ADF 10 or in the direction opposite to the conveyance direction. That is, the control unit 222 can cause the position of the first carriage 212 to be moved in the left-and-right direction in FIG. 3. As the position of the first carriage 212 moves, the reading position of the first image reading unit 210 also moves. In the adjustment mode, the control unit 222 adjusts the reading position to be coincident with the contact position by causing the position of the first carriage 212 to be moved.

The second carriage 214 includes a reflection plate 214-1 and a reflection plate 214-2. Light reflected by the reflection plate 212-1 is incident on the reflection plate 214-1. The reflection plate 214-1 reflects the incident light in the direction of the reflection plate 214-2. Light reflected by the reflection plate 214-1 is incident on the reflection plate 214-2. The reflection plate 214-2 reflects the incident light in the direction of the lens 216.

The lens 216 collects light reflected by the reflection plate 214-2. The lens 216 forms an image of the collected light on an image forming surface of the CCD sensor 218.

The CCD sensor 218 is mounted on a CCD sensor substrate 220. For example, the CCD sensor 218 is a hybrid 4-line sensor. The hybrid 4-line sensor includes a 3-line sensor for reading a color image and a 1-line sensor for reading a monochrome image. The 3-line sensor reads light of R (red), G (green), and B (blue). The CCD sensor 218 converts the light imaged by the lens 216 into electric charges. By this conversion, the CCD sensor 218 converts the image formed by the lens 216 into an electric signal.

The CCD sensor 218 includes a plurality of image-capturing elements arranged in the main scanning line direction. The main scanning line direction is a direction orthogonal to the conveyance direction of the sheet S by the ADF 10. The CCD sensor 218 outputs an electric signal based on a horizontal synchronizing signal input from the control unit. The CCD sensor 218 outputs an electric signal generated by being simultaneously read by a plurality of image-capturing elements as an electric signal for one main scanning line. When the next horizontal synchronizing signal is input, the CCD sensor 218 reads an image for the next one line of main scanning and outputs an electric signal. In this way, the CCD sensor 218 sequentially outputs electric signals for one main scanning line, which is obtained by reading the sheet S in the main scanning line direction.

The CCD sensor substrate 220 generates image data based on the electric signal generated by photoelectric conversion of the CCD sensor 218.

The control unit 222 controls the operations of the first carriage 212, the second carriage 214, and the CCD sensor substrate 220. For example, the control unit 222 controls movement of the first carriage 212 and turning on and off of the light source 212-2 of the first carriage 212.

The control unit 222 (control unit) acquires the adjustment mode switching instruction output from the control unit 101. When the adjustment mode switching instruction is acquired, the control unit 222 switches the operation mode of the image reading device 200 from the normal mode to the adjustment mode. When the operation mode is switched from the normal mode to the adjustment mode, the control unit 222 executes adjustment processing for adjusting the reading position of the document by the first image reading unit 210. When adjustment processing is completed, the control unit 222 switches the operation mode of the image reading device 200 from the adjustment mode to the normal mode again. Details of the adjustment processing by the control unit 222 will be described later.

In this embodiment, the CCD sensor 218 of the first image reading unit 210 reads an image of the first surface (front surface) of the sheet S moving on the front surface of the through-read glass 21. The second image reading unit 17 reads an image on the second surface (back surface) of the sheet S. With this configuration, the image forming apparatus 100 can read the image on the first side and the image on the second side of the sheet S by allowing the sheet S to pass through the conveyance path only once.

In the ADF 10, a first light diffusing unit 19 is provided in a portion where light emitted from the light source 212-2 passes through the through-read glass 21 and the conveyance path. The first light diffusing unit 19 is a light diffusing member, but may be any member that does not specularly reflect incident light. The first light diffusion portion 19 may be a member containing a material that absorbs incident light. For example, the first light diffusing unit 19 is a white plate.

When the sheet S is conveyed onto the through-read glass 21, light transmitted through the through-read glass 21 is reflected by the sheet S. On the other hand, when the sheet S is not conveyed onto the through-read glass 21, the light transmitted through the through-read glass 21 is diffused by the first light diffusing unit 19. As a result, light intensity at the CCD sensor 218 has a high value when the sheet S is conveyed onto the through-read glass 21.

The second image reading unit 17 has the same configuration as the first image reading unit 210. The second image reading unit 17 includes a light source and a CCD sensor. The CCD sensor includes a plurality of image-capturing elements arranged in the main scanning line direction. The second image reading unit 17 guides light emitted from the light source to the second surface of the sheet S. The second image reading unit 17 photoelectrically converts an optical signal into an electric signal based on the reflected light from the sheet S, and outputs image data.

The second image reading unit 17 outputs an electric signal based on the horizontal synchronizing signal input from the control unit. When the next horizontal synchronizing signal is input, the second image reading unit 17 reads an image for the next main scanning line and outputs an electrical signal. In this way, the second image reading unit 17 sequentially outputs electric signals for one main scanning line, which is obtained by reading the sheet S in the main scanning line direction.

In the ADF 10, the second image reading unit 17 is provided, for example, downstream of the first image reading unit 210 in the conveyance direction. The second image reading unit 17 may be provided upstream of the first image reading unit 210 in the conveyance direction. A second light diffusing unit 20 is provided in a portion where light emitted from the light source included in the second image reading unit 17 passes through the conveyance path. The second light diffusing unit 20 diffuses the light emitted from the light source, similarly to the first light diffusing unit 19. With this configuration, the light intensity at the CCD sensor when the sheet S is being conveyed to the second image reading unit 17 is higher than the light intensity when the sheet S is not being conveyed to the second image reading unit 17.

Hereinafter, adjustment of the reading position of the first image reading unit 210 will be described.

Dust such as paper dust may adhere to the through-read glass 21. For example, paper dust is generated by conveyance of the sheet S. When a document is read in a state where dust adheres on the through-read glass 21, dust present as dots appears in the image as longitudinal stripes extending in the document conveyance direction (sub-scanning direction). With this, image quality is deteriorated.

At the position (contact position) where the conveyed sheet S and the through-read glass 21 come into contact, the adhered dust is scraped out as the sheet S is conveyed. The adhered dust is scraped out by friction with the edge of the sheet S or the front surface of the sheet S, for example. In this way, since the self-cleaning effect occurs at the contact position, deterioration of image quality can be suppressed by setting the contact position as the reading position.

Figure 4:
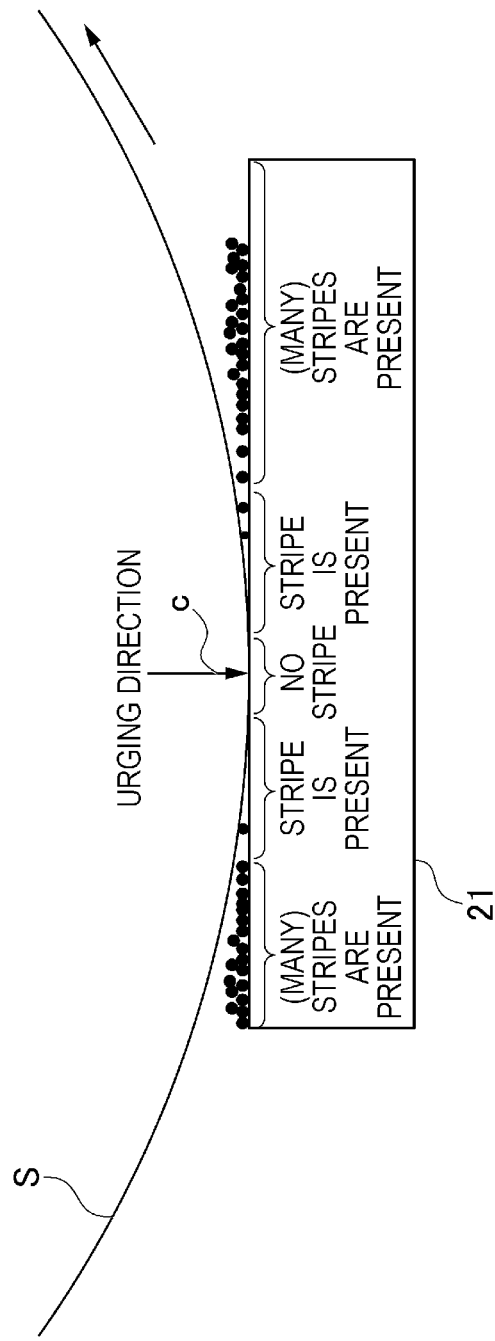
FIG. 4 is a diagram for illustrating self-cleaning effect at a contact position.

FIG. 4 is a diagram for illustrating the self-cleaning effect at the contact position. The sheet S conveyed from the document tray and passing over the through-read glass 21 is urged by the urging member 24 in the urging direction illustrated by an arrow. With this configuration, a contact position c at which the sheet S and the through-read glass 21 come into contact with each other occurs. At the contact position c, as described above, the dust adhered to the through-read glass 21 is scraped out due to the friction with an end portion of the sheet S or the front surface of the sheet S. For that reason, when the reading position and the contact position c are coincident with each other, longitudinal stripes (hereinafter, referred to as "stripe image") caused by adhesion of dust are unlikely to occur in the read image.

On the other hand, when the reading position and the contact position c are not coincident with each other, there is a gap between the sheet S and the through-read glass 21 on the reading position. For that reason, dust adhering to the reading position on the through-read glass 21 is not scraped out, and a stripe image may occur in the read image.

When the reading position and the contact position c are not coincident with each other but are close to each other, the gap between the sheet S and the through-read glass 21 is narrow. Therefore, at least dust larger than the interval gap is easily scraped out. The gap between the sheet S and the through-read glass 21 becomes wider as the distance between the reading position and the contact position c becomes longer. For that reason, more stripe images occur in the read image as the distance between the reading position and the contact position c becomes longer.

Figure 5:
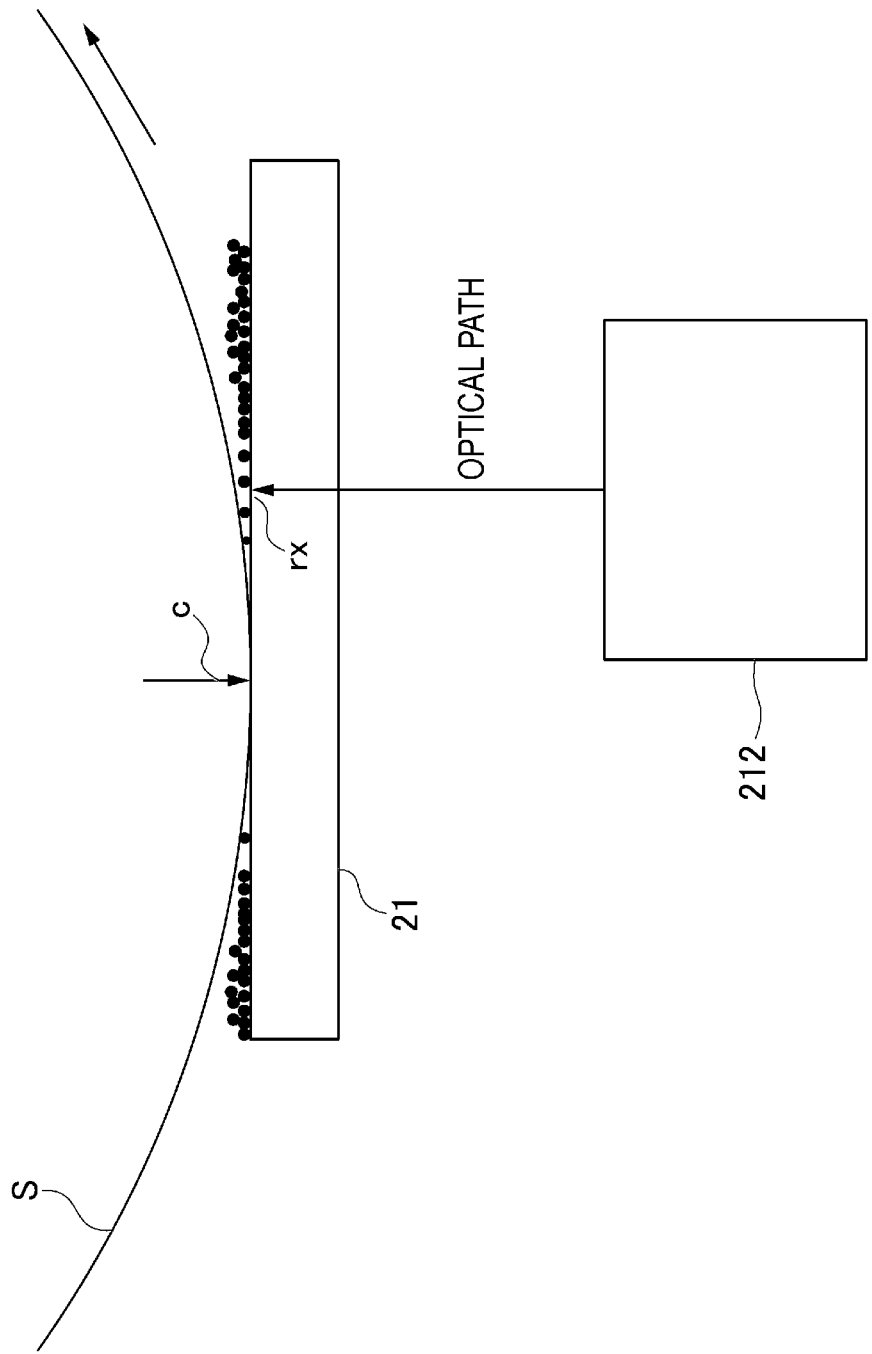
FIG. 5 is a diagram for illustrating adjustment of a reading position by the image reading unit 200.
Figure 6:
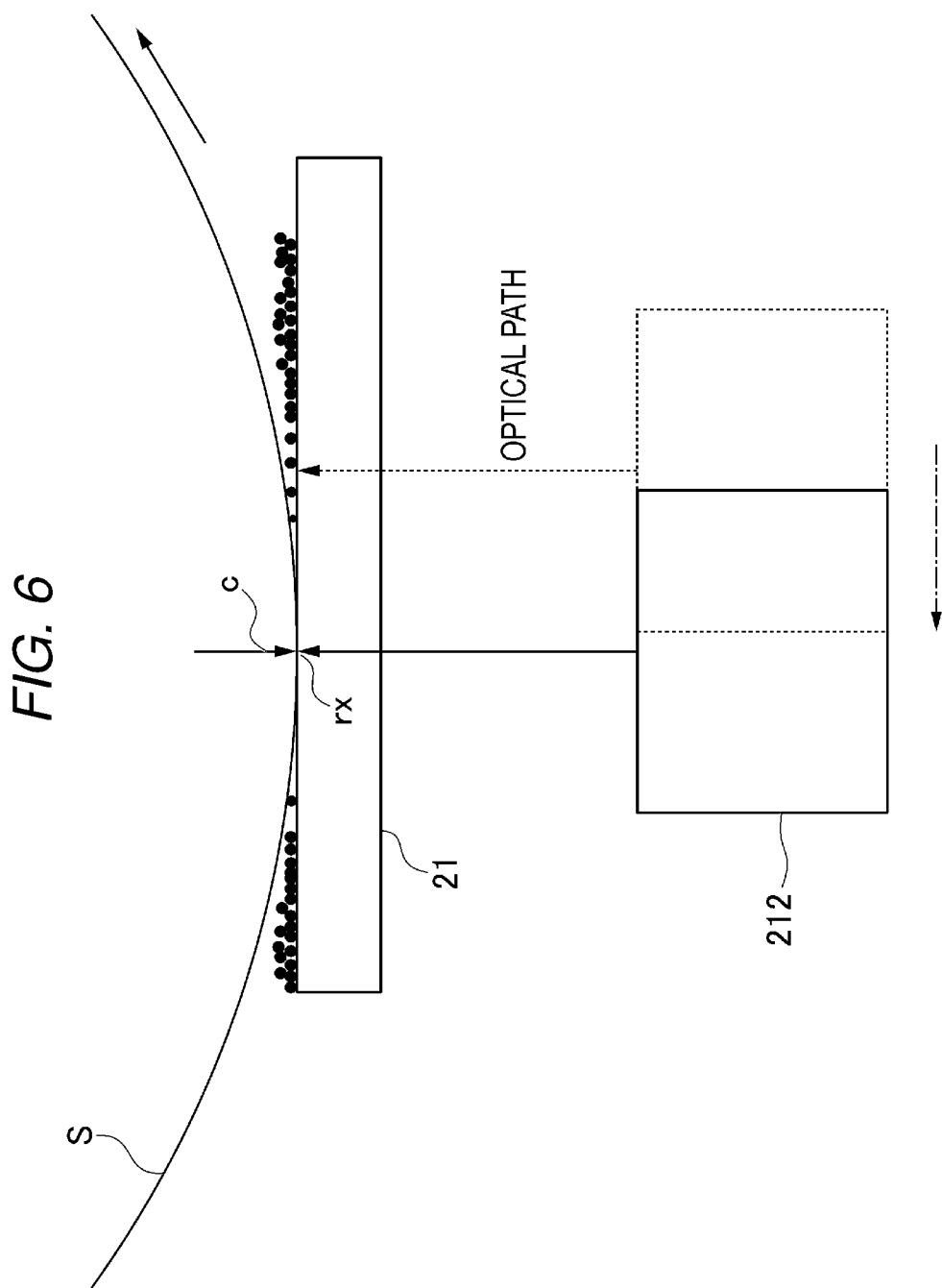
FIG. 6 is a diagram for illustrating adjustment of the reading position by the image reading unit 200.

The image reading device 200 in this embodiment detects the contact position c. The image reading device 200 adjusts the reading position so that the detected contact position c and the reading position of the first image reading unit 210 are coincident with each other. FIG. 5 and FIG. 6 are diagrams for illustrating adjustment of the reading position by the control unit 222 of the image reading unit 200 of this embodiment. As illustrated in FIG. 5, the position where an optical path of light emitted from (light source 212-2 of) the first carriage 212 and the front surface of the through-read glass 21 intersect is a reading position rx.

The control unit 222 of the image reading device 200 can recognize the position of the first carriage 212. The control unit 222 can recognize the reading position of the first image reading unit 210 based on the position of the first carriage 212. The control unit 222 can detect the contact position c at which the sheet S and the through-read glass 21 come into contact with each other. A method of detecting the contact position c by the control unit 222 will be described later.

The control unit 222 determines whether or not the detected contact position c and the reading position are coincident with each other. When it is determined that the positions of the two positions are not coincident with each other, the control unit 222 causes the position of the first carriage 212 to be moved so that the reading position is coincident with the contact position c. In this way, the reading position is adjusted so that the contact position c and the reading position are coincident with each other.

For example, as illustrated in FIG. 5, consider a case where the reading position rx is shifted from the contact position c in the conveyance direction of sheet S. In this case, the control unit 222 causes the first carriage 212 to move in the direction opposite to the conveyance direction of sheet S. That is, the control unit 222 causes the first carriage 212 to move in the direction (left in the figure) of the one-dot chain line arrow illustrated in FIG. 6. With this configuration, the reading position moves from the reading position rx illustrated in FIG. 5 to a reading position ry illustrated in FIG. 6. As illustrated in FIG. 6, the reading position ry and the contact position c are at the same position. In this way, the reading position of the first image reading unit 210 is adjusted.

Hereinafter, the method of detecting the contact position c by the control unit 222 will be described. The image forming apparatus 100 in this embodiment detects the contact position c by reading a sheet for adjusting the reading position. A predetermined pattern image (hereinafter referred to as "chart") is formed on the sheet for adjusting the reading position. Hereinafter, the sheet for adjusting the reading position will be referred to as "chart sheet PS".

The chart sheet PS is placed on the document tray 11 by an administrator of the image forming apparatus 100, for example. The administrator places the chart sheet PS and performs an input operation indicating the adjustment mode switching instruction described above from the control panel 120, for example. As described above, the adjustment mode switching instruction is an instruction for switching the operation mode of the image forming apparatus 100 from the normal mode to the adjustment mode. With this configuration, detection processing of the contact position c by the control unit 222 is started.

Figure 7:
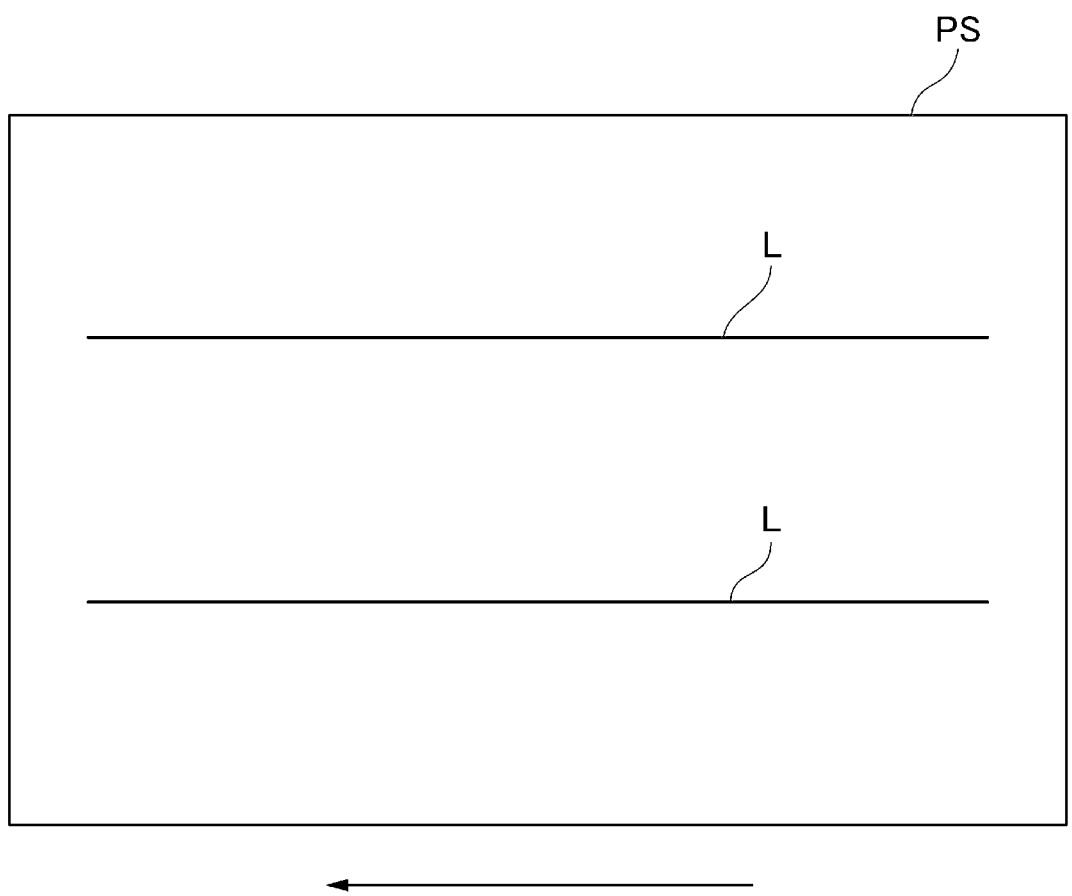
FIG. 7 is a diagram illustrating an example of a chart sheet PS.

FIG. 7 is a diagram illustrating an example of the chart sheet PS. As illustrated in FIG. 7, the chart sheet PS is a sheet on which an image illustrating two parallel straight lines L is formed. The arrow in the figure represents the conveyance direction when the chart sheet PS is conveyed onto the through-read glass 21 by the ADF 10.

When the chart sheet PS is conveyed onto the through-read glass 21, the control unit 222 sequentially causes the first carriage 212 to move to a plurality of predetermined positions. With this configuration, the control unit 222 can cause the first image reading unit 210 to read a chart formed on the chart sheet PS at a plurality of different positions (hereinafter, referred to as "reading candidate positions").

Figure 8:
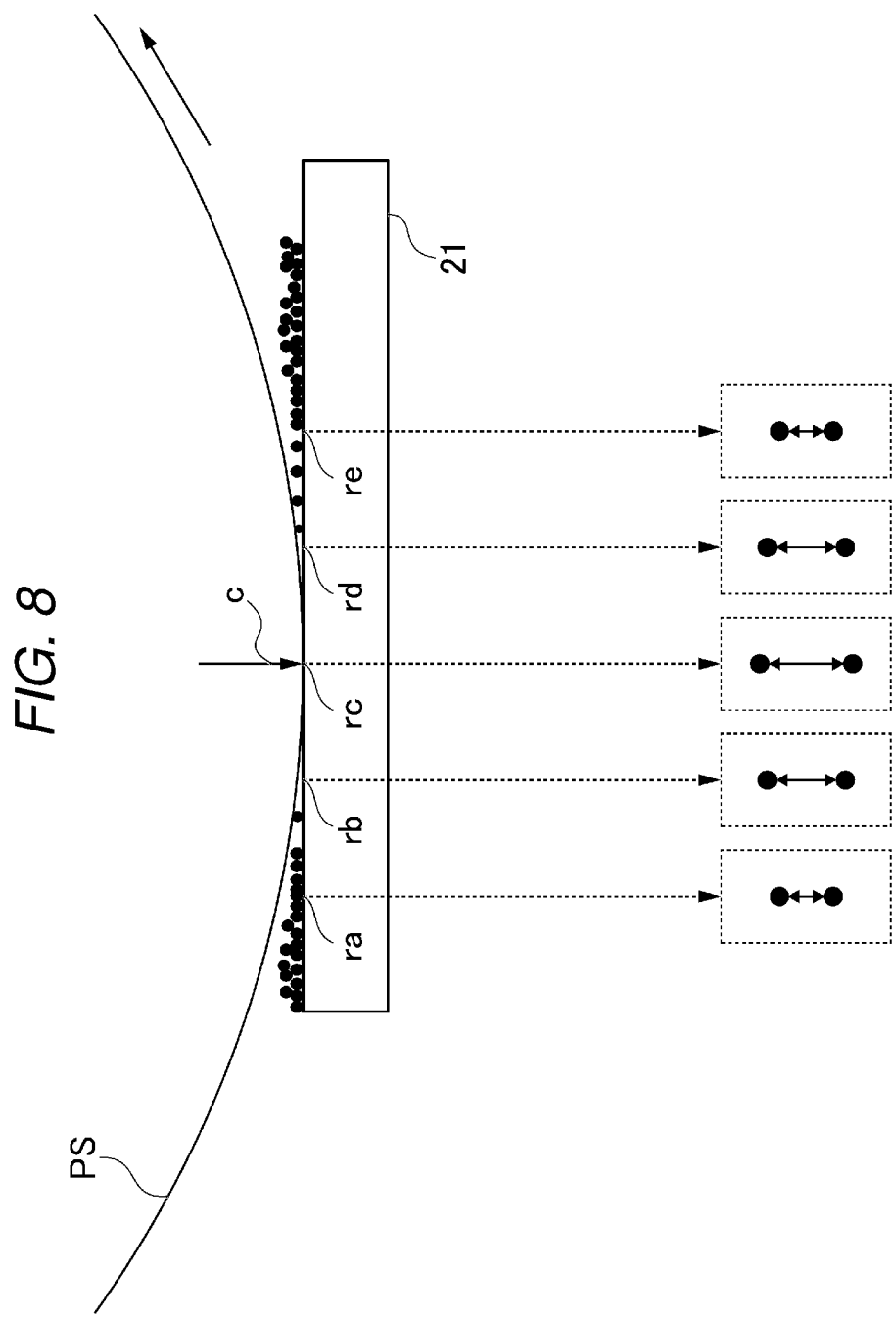
FIG. 8 is a diagram illustrating an example of reading a chart at a plurality of reading positions by the image reading device 200.

FIG. 8 is a diagram illustrating an example of reading a chart at a plurality of reading candidate positions by the image reading device 200. In this embodiment, the control unit 222 causes the first carriage 212 to be sequentially moved so that five reading candidate positions are formed, and causes the chart to be read. As illustrated in FIG. 8, the chart is read at five points of reading candidate positions ra, rb, rc, rd, and re on the through-read glass 21. The positions of the reading candidate positions ra, rb, rc, rd, and re are positions shifted from each other in the conveyance direction (sub-scanning direction) of the chart sheet PS.

The control unit 222 executes reading for one line of main scanning for each of the five reading candidate positions ra, rb, rc, rd, and re. With this configuration, two points on the two straight lines L formed on the chart sheet PS are read at each of the five reading candidate positions ra, rb, rc, rd, and re. In FIG. 8, two points read at each of five reading candidate positions ra, rb, rc, rd, and re are illustrated.

As illustrated in FIG. 8, the distance between the two read points becomes wider as the reading candidate position is closer to the contact position c, and narrower as the reading candidate position is farther from the contact position c. This is because the gap between the chart sheet PS and the through-read glass 21 becomes wider as the reading candidate position is farther from the contact position c. The gap becomes wider as the reading candidate position is farther from the contact position c, and thus the magnification of the read image (hereinafter, referred to as "reading magnification") becomes lower.

Figure 9:
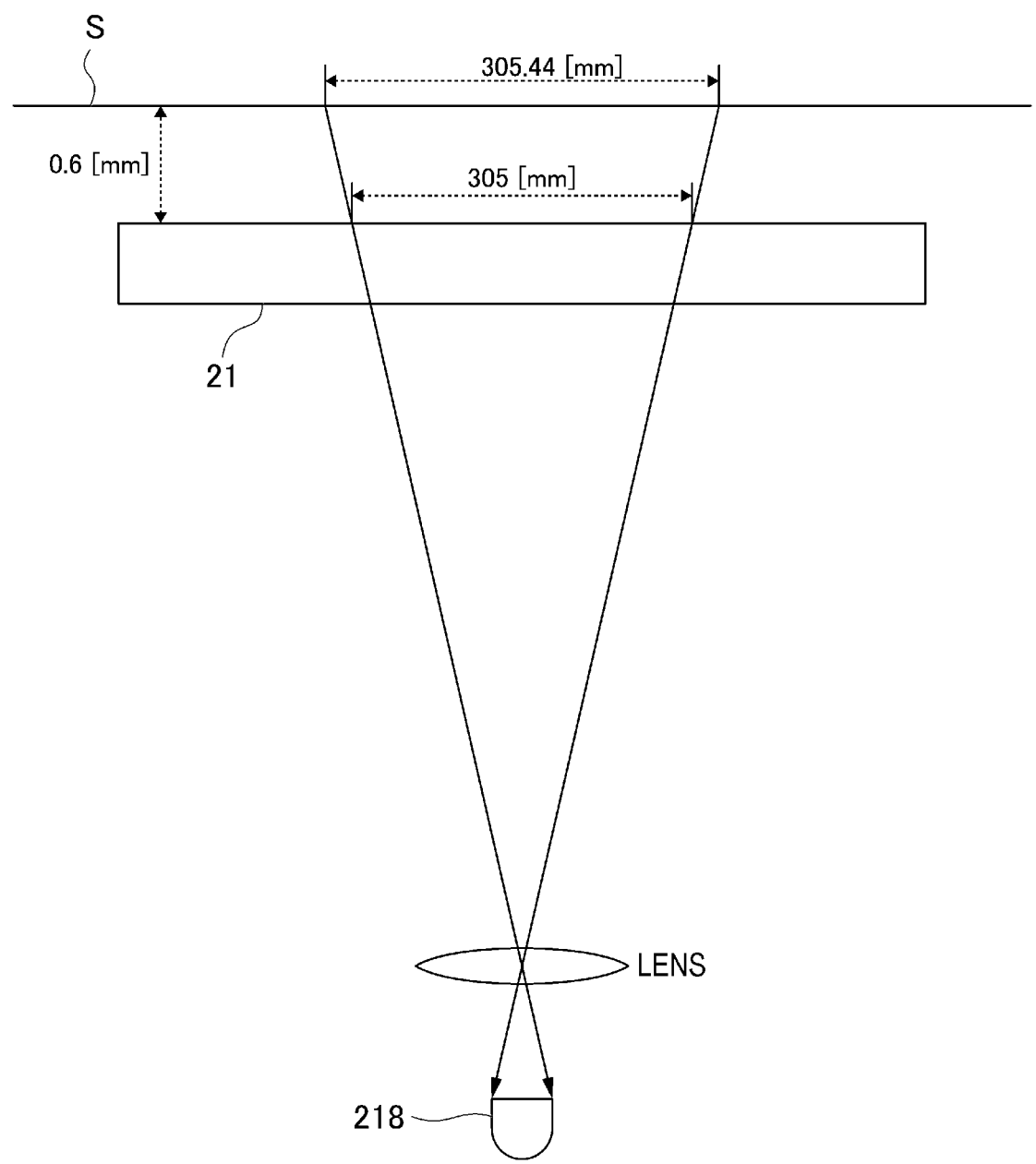
FIG. 9 is a diagram for illustrating a change in reading magnification.

FIG. 9 is a diagram for illustrating a change in reading magnification. Light emitted from the light source 212-2 is reflected by the document surface (sheet S), and as illustrated in the figure, the reflected light forming an image of the document is condensed on the CCD sensor 218 via a lens, for example. As a result, the document is read. For example, consider a case where a document of a width of 305 [mm] formed on the sheet S is read. In this case, if the reading position on the through-read glass 21 and the sheet S are separated by 0.6 [mm], a range of 305.44 [mm] falls within the angle of view.

The range that falls within the angle of view becomes wider as the reading candidate position is farther from the sheet S. This means that the width of the read image becomes narrower than the width of the actual document as the reading candidate position is farther from the sheet S. That is, the reading magnification becomes lower as the reading candidate position is farther from the sheet S.

At the contact position c, since there is almost no gap between the chart sheet PS and the through-read glass 21, the reading magnification becomes highest. For that reason, when the contact position c and the reading candidate position are at the same position, the distance between the two read points becomes the longest. The control unit 222 specifies the reading candidate position where the reading magnification becomes the highest (that is, the distance between the two read points is the longest). With this configuration, the contact position c is specified. The control unit 222 adjusts the position of the first carriage 212 so that the specified contact position c becomes the reading position in the normal mode.

As such, the image reading device 200 according to this embodiment reads the chart at a plurality of reading candidate positions shifted from each other in the conveyance direction of sheet S. The image forming apparatus 100 detects the contact position c based on the reading magnification of the read chart. The image forming apparatus 100 adjusts the position of the first carriage 212 so that the detected contact position c becomes the reading position in the normal mode.

Figure 10:
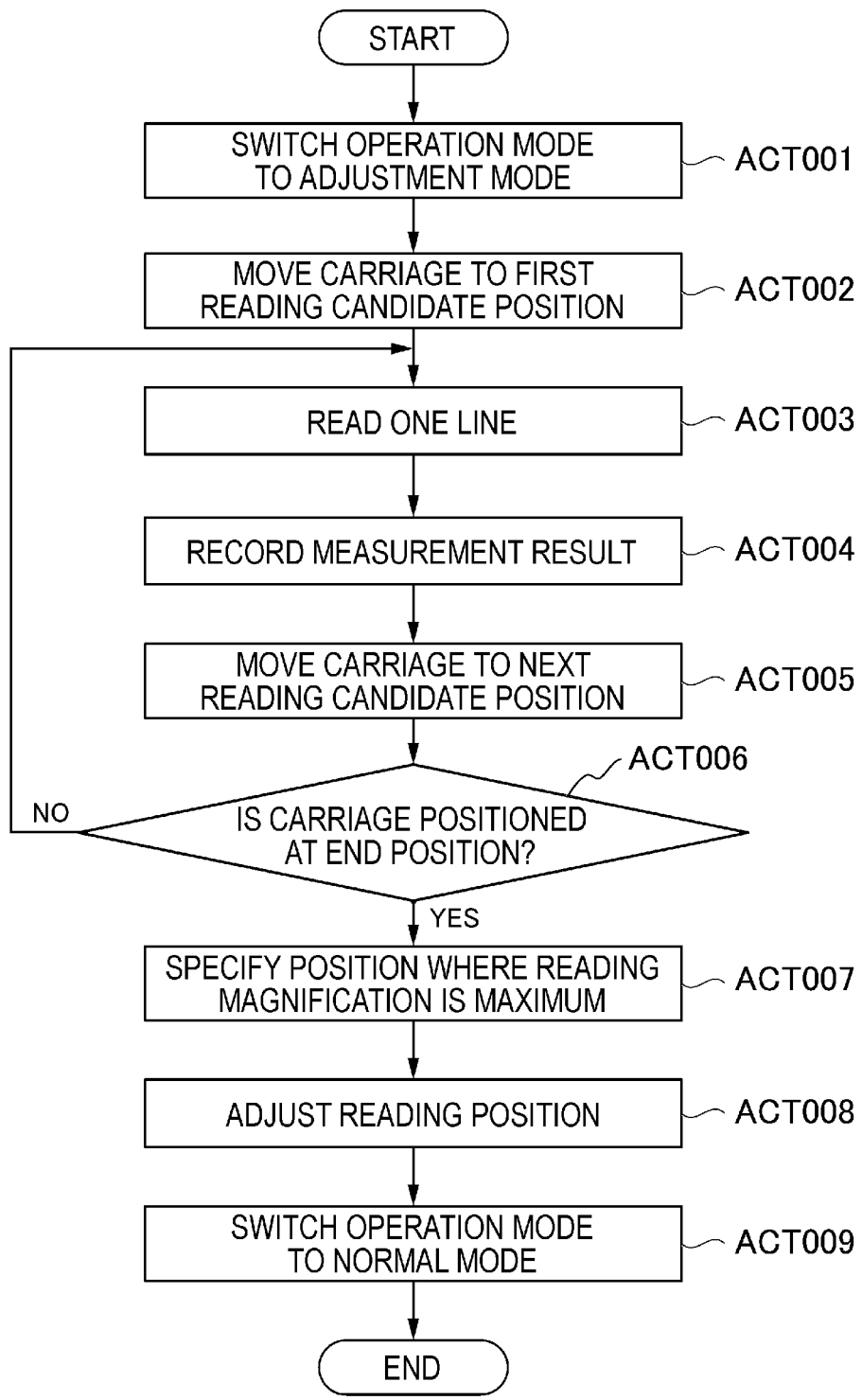
FIG. 10 is a flowchart illustrating an operation of a control unit 222.

Hereinafter, an example of the operation of the control unit 222 will be described. FIG. 10 is a flowchart illustrating the operation of the control unit 222 of the image reading device 200 in this embodiment. This flowchart starts when the control unit 222 acquires the adjustment mode switching instruction.

The adjustment mode switching instruction is generated, for example, by the administrator of the image forming apparatus 100 performing an input operation using the control panel 120. The control panel 120 outputs the generated instruction information to the control unit 101. The control unit 101 outputs the acquired instruction information to the control unit 222 of the image reading device 200. For example, the chart sheet PS is placed on the document tray 11 in advance by the administrator of the image forming apparatus 100.

The control unit 222 acquires the adjustment mode switching instruction and switches the operation mode of the image forming apparatus 100 from the normal mode to the adjustment mode (ACT 001). The control unit 222 controls the ADF 10 via the control unit 101, for example, and conveys the chart sheet PS placed on the document tray 11 onto the through-read glass 21.

The control unit 222 causes the first carriage 212 to be moved. The control unit 222 controls the position of the first carriage 212 so as to be the first reading candidate position among a plurality of predetermined reading candidate positions (ACT 002). The control unit 222 causes the first image reading unit 210 to read one line of main scanning (ACT 003).

The control unit 222 measures the reading magnification based on the distance between the two read points, and records the measurement result in a storage medium (for example, the memory 104) (ACT 004). The control unit 222 causes the first carriage 212 to be moved further. The control unit 222 controls the position of one carriage 212 so as to be the next reading candidate position among the plurality of reading candidate positions determined in advance (ACT 005).

When reading is completed at all of the plurality of reading candidate positions determined in advance, the moved first carriage 212 is positioned at the end position. When it is determined that the first carriage 212 is not positioned at the end position (NO in ACT 006), the control unit 222 repeats processing in and after ACT 003 described above.

When it is determined that the first carriage 212 is positioned at the end position (YES in ACT 006), the control unit 222 refers to the storage medium (for example, the memory 104) and specifies the reading candidate position where the reading magnification becomes the maximum value (ACT 007). The control unit 222 adjusts the position of the first carriage 212 so that the specified reading candidate position becomes the reading position in the normal mode (ACT 008).

The control unit 222 switches the operation mode of the image forming apparatus 100 from the adjustment mode to the normal mode (ACT 009). Thus, the operation of the control unit 222 indicated by the flowchart of FIG. 10 ends.

As described above, the image forming apparatus 100 according to this embodiment includes the through-read type image reading device 200. The image reading device 200 adjusts the reading position using the chart sheet PS on which a predetermined pattern image (chart) is formed. The image reading device 200 respectively reads the chart at a plurality of different reading candidate positions that are shifted in the conveyance direction of sheet S. The image reading device 200 measures the reading magnification of each of the images illustrating the chart read at the reading candidate positions. The image reading device 200 adjusts the reading position so that the reading candidate position where the measured reading magnification is the highest value is a new reading position.

With such a configuration, the image reading device 200 can set the position where the reading magnification is the highest value as the reading position. The position where the reading magnification becomes the highest value is the contact position c where the conveyed sheet S and the through-read glass 21 come into contact with each other. At the contact position c, dust such as paper dust adhered to the through-read glass 21 is scraped out by friction with the end portion of the conveyed sheet S or the front surface of the sheet. For that reason, dust is unlikely to be present at the reading position on the through-read glass 21 positioned so as to be coincident with the contact position c. With this configuration, the image reading device 200 can suppress occurrence of stripe images in the read image due to the dust adhering onto the through-read glass 21.

In the embodiment described above, the control unit 222 is configured to read one main scanning line for each of the plurality of reading candidate positions. However, the control unit 222 is not limited to such a configuration. The control unit 222 may be configured to read the entire chart sheet PS at each of the plurality of reading candidate positions. In this case, each read image is not an image illustrating two points but an image illustrating two straight lines L. The control unit 222 measures the reading magnification based on the distance between the two read straight lines L, and records the measurement result in a storage medium (for example, the memory 104).

In the embodiment described above, the control unit 222 is configured to measure the reading magnification based on the distance between the read two points and compare the measured reading magnifications. With this configuration, the control unit 222 specifies the reading candidate position where the reading magnification is the highest value. However, the control unit 222 is not limited to such a configuration. The control unit 222 may be configured to compare the distances between the two read points. The control unit 222 may specify the reading candidate position with the highest reading magnification by specifying the reading candidate position with the longest distance between the two points. That is, any measurement method and any determination method may be used as long as the reading candidate position with the highest reading magnification can be specified.

In the embodiment described above, the pattern image (chart) formed on the chart sheet PS is an image illustrating two parallel straight lines L. However, the pattern image configuration is not limited to such a configuration. The pattern image (chart) may be, for example, an image illustrating three parallel straight lines. Alternatively, the pattern image (chart) may be, for example, an image illustrating two points arranged at a predetermined interval in a direction (that is, the main scanning direction) orthogonal to the conveyance direction of the chart sheet PS. In this case, the control unit 222 desirably causes the entire chart sheet PS to be read at each of the plurality of reading candidate positions.

Alternatively, the pattern image (chart) may be, for example, an image illustrating a straight line of a predetermined length extending in a direction (that is, the main scanning direction) orthogonal to the conveyance direction of the chart sheet PS. In this case, the control unit 222 may measure and compare the length of the straight line included in each image read at each of the plurality of reading candidate positions. The control unit 222 may adjust the reading candidate position with the longest straight line to be the reading position in the normal mode.

In reading the charts at the plurality of reading candidate positions, the chart sheet PS may be conveyed each time to perform the flow reading for each reading candidate position. Alternatively, the reading of the charts at the plurality of reading candidate positions may be collectively performed while the chart sheet PS is stationary on the through-read glass 21.

In the embodiment described above, the control unit 222 is configured to sequentially read a plurality of predetermined reading candidate positions. However, the control unit 222 is not limited to such a configuration. The control unit 222 may start reading from a reading candidate position estimated to be closer to the contact position c. The reading candidate position estimated to be close to the contact position c is, for example, a central position in the conveyance direction (sub-scanning direction) of the sheet S on the through-read glass 21. In this case, for example, the control unit 222 sets the reading candidate position adjacent to a first selected reading candidate position as a second reading candidate position. The term "adjacent" as used herein means, for example, that the sheet S is adjacent to the sheet S in the conveyance direction. Being adjacent to the opposite side of the sheet S in the conveyance direction is referred to as "oppositely adjacent".

If the measured reading magnification is lower than the reading magnification at the immediately preceding reading candidate position, the control unit 222 does not perform reading for the reading candidate position further adjacent thereto. Next, the control unit 222 sets the reading candidate position that is oppositely adjacent to the first selected reading candidate position as the next reading candidate position. If the measured reading magnification is lower than the reading magnification at the immediately preceding reading candidate position, the control unit 222 does not perform reading for the reading candidate position further oppositely adjacent thereto. By adopting such a configuration, the control unit 222 can specify the contact position c with a smaller number of readings.

In this embodiment, as an example, reading candidate positions are five, but the number of reading candidate positions is not limited thereto. The larger the number of reading candidate positions, the more accurately the contact position c and the reading position can be coincident with each other.

The intervals between the plurality of reading candidate positions may or may not be constant intervals. For example, a configuration in which the distance between the reading candidate positions becomes narrower as the position is closer to the contact position c on the through-read glass 21 may be adopted. In this case, the contact position c and the reading position can be made more accurately coincident with each other while suppressing an increase in the number of readings.

In this embodiment, the control unit 222 is configured to adjust the position of the first carriage 212. As a result, a configuration in which the reading position of the first surface (front surface) of the sheet S by the first image reading unit 210 is adjusted is adopted. By adopting such a configuration, the image reading device 200 can suppress occurrence of stripe images on the first surface (front surface) of the sheet S. However, the control unit 222 may be further configured to adjust the position of the second image reading unit 17 with the same configuration. In this case, the reading position of the second surface (back surface) of the sheet S by the second image reading unit 17 is adjusted. By adopting such a configuration, the image reading device 200 can suppress occurrence of stripe images not only on the first surface (front surface) of the sheet S but also on the second surface (back surface).

According to the image forming apparatus 100 of the embodiment described above, the document can be read at the position where the self-cleaning effect is high. With this configuration, occurrence of stripe images can be suppressed, and thus deterioration of the quality of the read image can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading device, comprising:
a processor configured to:
convey a sheet to a reading surface;
read, via the image reading device, predetermined pattern images formed on the sheet for each of a plurality of reading candidate positions on the reading surface which are different from each other in a conveyance direction of the sheet; and
move a reading position of the image reading device in the conveyance direction on the reading surface by moving the image reading device based on reading magnification of each of the predetermined pattern images read for each of the reading candidate positions.

2. The image reading device according to claim 1, wherein
the processor is further configured to move the image reading device such that the reading candidate position where the reading magnification is maximum is the reading position.

3. The image reading device according to claim 1, wherein
each of the predetermined pattern images is an image comprising at least two straight lines parallel to the conveyance direction.

4. The image reading device according to claim 3, wherein
the the processor is further configured to read one main scanning line for each of the reading candidate positions.

5. The image reading device according to claim 4, wherein
the processor is further configured to specify the reading candidate position where the reading magnification is maximum by specifying the reading candidate position where a distance between images illustrating two points read from each of two straight lines is maximum, for each of the reading candidate positions.

6. The image reading device according to claim 1, wherein
the the processor is further configured to start reading from a reading candidate position, which is closer to a central position on the reading surface in the sheet conveyance direction, of the plurality of reading candidate positions.

7. The image reading device according to claim 1, wherein
the processor is further configured to move the reading position when instruction information for switching to an operation mode for adjusting the reading position is acquired.

8. The image reading device according to claim 7, wherein the processor is further configured to
output the instruction information according to an input operation by a user.

9. An image forming apparatus, comprising:
a processor configured to:
convey a sheet to a reading surface;
read, by an image reading device, predetermined pattern images formed on the sheet conveyed by the conveyance unit for each of a plurality of reading candidate positions on the reading surface which are different from each other in a conveyance direction of the sheet;
move a reading position of the image reading device in the conveyance direction on the reading surface by moving the image reading device based on reading magnification of each of the predetermined pattern images read for each of the reading candidate positions; and
form an image read at the reading position on another sheet.

10. The image forming apparatus according to claim 9, wherein
the the processor is further configured to move the image reading device such that the reading candidate position where the reading magnification is maximum is the reading position.

11. The image forming apparatus according to claim 9, wherein each of the pattern images is an image comprising at least two straight lines parallel to the conveyance direction.

12. The image forming apparatus according to claim 9, wherein
the processor is further configured to start reading from a reading candidate position, which is closer to a central position on the reading surface in the sheet conveyance direction, of the plurality of reading candidate positions.

13. An image forming method, comprising:
conveying a sheet to a reading surface;
reading predetermined pattern images formed on the conveyed sheet for each of a plurality of reading candidate positions on the reading surface which are different from each other in a conveyance direction of the sheet; and
moving a reading position of an image reading device in the conveyance direction on the reading surface by moving the image reading device based on reading magnification of each of the predetermined pattern images read for each of the reading candidate positions.

14. The image forming method according to claim 13, further comprising:
moving the image reading device such that the reading candidate position where the reading magnification is maximum is the reading position.

15. The image forming method according to claim 13, wherein
each of the pattern images is an image comprising at least two straight lines parallel to the conveyance direction.

16. The image forming method according to claim 15, further comprising:
reading one main scanning line for each of the reading candidate positions.

17. The image forming method according to claim 16, further comprising:
specifying the reading candidate position where the reading magnification is maximum by specifying the reading candidate position where a distance between images illustrating two points read from each of two straight lines is maximum, for each of the reading candidate positions.

18. The image forming method according to claim 13, further comprising:
start reading from a reading candidate position, which is closer to a central position on the reading surface in the sheet conveyance direction, of the plurality of reading candidate positions.

19. The image forming method according to claim 13, further comprising:
moving the reading position when instruction information for switching to an operation mode for adjusting the reading position is acquired.

20. The image forming method according to claim 19, further comprising:
outputting the instruction information according to an input operation by a user.

\* \* \* \* \*